United States Patent [19]

Järvenkylä

[11] Patent Number: 4,988,466
[45] Date of Patent: Jan. 29, 1991

[54] METHOD AND AN APPARATUS FOR THE PRODUCTION OF RIBBED PIPES

[75] Inventor: Jyri Järvenkylä, Salpakangas, Finland

[73] Assignee: Uponor N.V., Emmaplein, St. Maarten, Netherlands Antilles

[21] Appl. No.: 382,653
[22] PCT Filed: Feb. 19, 1987
[86] PCT No.: PCT/FI87/00027
§ 371 Date: Jul. 28, 1989
§ 102(e) Date: Jul. 28, 1989
[87] PCT Pub. No.: WO88/06087
PCT Pub. Date: Aug. 25, 1988

[51] Int. Cl.⁵ .................................................. B29C 47/92
[52] U.S. Cl. .................................. 264/40.1; 264/40.5; 264/40.7; 264/508; 264/209.3; 264/167; 425/145; 425/149; 425/163; 425/532; 425/393; 425/396
[58] Field of Search ................ 264/40.7, 566, 568, 264/508, 167, 173, 40.1, 40.5, 209.3, 209.4; 425/149, 145, 146, 150, 163, 170, 380, 392, 393, 396, 532

[56] References Cited

U.S. PATENT DOCUMENTS

| | | | |
|---|---|---|---|
| 3,134,832 | 5/1964 | Smith | 264/167 |
| 3,357,049 | 12/1967 | Spindler | 425/146 |
| 3,705,779 | 12/1972 | van Zon | 264/167 |
| 3,743,456 | 7/1973 | Cini | 425/133.1 |
| 4,038,011 | 7/1977 | Lemelson | 425/325 |
| 4,056,344 | 11/1977 | Lemelson | 425/133.1 |
| 4,255,107 | 3/1981 | Martin | 425/163 |
| 4,365,948 | 12/1982 | Chaplain | 425/380 |
| 4,710,337 | 12/1987 | Nordstrom | 425/396 |
| 4,721,594 | 1/1988 | Jarvenkyla | 425/380 |
| 4,867,928 | 9/1989 | Jarvenkyla et al. | 425/396 |

FOREIGN PATENT DOCUMENTS

| | | |
|---|---|---|
| 0135922 | 4/1985 | European Pat. Off. . |
| 2706927 | 8/1978 | Fed. Rep. of Germany ..... 264/40.7 |
| 57-116616 | 7/1982 | Japan ................................ 264/209.3 |

Primary Examiner—Jeffery Thurlow
Attorney, Agent, or Firm—Ladas & Parry

[57] ABSTRACT

This invention relates to a method and an apparatus for the production of ribbed pipes. According to the method a plastic material is fed through an extruder into a pipe molding space (12) defined by an extrusion sleeve (4), a mandrel (9) and chill molds (1, 2) moving in the direction of the central axis of the mandrel. When the pressure of the molding space (12) deviates from a desired value, a gap is formed between the chill molds (1,2), and plastic material is squeezed into the gap, or grooves (13) of the chill molds are filled up incompletely. In order to restore the pressure to the proper value, the pressure of the material contained in the molding space is directly measured by means of a pressure sensor (14) which adjusts the speed of the extruder or the chill molds.

5 Claims, 1 Drawing Sheet

METHOD AND AN APPARATUS FOR THE PRODUCTION OF RIBBED PIPES

BACKGROUND OF THE INVENTION

The present invention relates to a method for the production of ribbed pipes, in which method a pressurized plastic material is fed through an extruder into a pipe moulding space defined by a mandrel, an end face of an extrusion sleeve and chill moulds moving in the direction of the central axis of the mandrel and defining a mould cavity surrounding the extrusion sleeve and the mandrel, the inner face of the chill moulds being provided with annular grooves.

German Offenlegungsschrift No. 2 362 444 discloses a method for the production of ribbed pipes wherein a plastic material is fed into a relatively small moulding space under a high pressure. The material can be fed into the moulding space by means of a high pressure, because the space is small and closed.

In order to provide the pipe with a desired shape, the feeding speed of the extruder and the speed of travel of the chill moulds have to be proportioned to each other in a determined way. If the feeding speed of the extruder is too high with respect to the speed of travel of the chill moulds, the pressure within the mould cavity rises to such an extent that the chill moulds are drawn apart from each other in the direction of their periphery. Plastic material is thereby squeezed into gaps formed between the chill moulds, which can be seen as axial ridges in the finished product.

The feeding speed of the extruder may also be too low with respect to the speed of travel of the chill moulds. Thereby the moulding space of the corrugating means is not filled up completely, which can be seen as incomplete ribs in the finished pipe.

In order to obtain pipes as flawless as possible, it is known to observe the pipe produced by the apparatus and alter the proportion between the speed of the extruder and that of the chill moulds as soon as deviations in the shape of the pipe are detected, cf. Swedish Published Specification No. 381 001.

A disadvantage of this method is the slow adjustment, because the adjustment cannot be commenced until the apparatus already has been producing a defective product for some time. Furthermore, the extent of the correction is difficult to estimate, wherefore it may take a long time before the apparatus again produces flawless pipe.

SUMMARY OF THE INVENTION

The object of the present invention is to provide a method for the production of ribbed pipes, which enables an accurate adjustment without any delay already at the moulding stage of the pipe. The method according to the invention is characterized in that the pressure of the material contained in the moulding space is measured, and that the feeding speed of the extruder and/or the speed of travel of the chill moulds is adjusted on the basis of the measured pressure.

By measuring the pressure of the material contained in the moulding space, information is obtained about the possible deviations already at the stage of the process when the pipe is being moulded, by virtue of which the adjustment can be effected in good time. For this reason it is possible to completely avoid the formation of defective pipes, which is economically beneficial. Since the measuring of the pressure of the moulding space also gives direct information on the strain exerted on the chill moulds, it is relatively easy to estimate the extent of the correction, so that the right correction can be made immediately.

The invention is also concerned with an apparatus for the production of ribbed pipes, comprising an extruder formed by a mandrel positioned on the central axis of the appratus, and an extrusion sleeve surrounding the mandrel, a ring-shaped nozzle being defined by the mandrel and the extrusion sleeve for the feeding of a pressurized plastic material; and corrugating means formed by a mandrel part positioned outside the extrusion sleeve and chill mould surrounding the extrusion sleeve and the mandrel and arranged to move in the direction of the central axis of the mandrel, the chill moulds, an end face of the extrusion sleeve and the mandrel defining therebetween a pipe moulding space.

The apparatus according to the invention is characterized in that a pressure sensor is attached to the end face of the extrusion sleeve defining the pipe moulding space or to the surface of the mandrel, which pressure sensor communicates with a device for adjusting the feeding speed of the extruder and/or the speed of travel of the chill moulds.

In view of the simplicity of the structure, it is advisable to position the pressure sensor on the end face of the extrusion sleeve or on the surface of the mandrel.

The apparatus according to the invention can be especially well applied to an extruder in which at least part of the end face of the extrusion sleeve is resilient. Thereby the apparatus can be so constructed that the resilient surface is formed by the end face of a spring-loaded or pressure-medium-loaded ring, and that the pressure sensor is arranged to sense the spring force of the spring or the pressure of the pressure medium. This embodiment has the advantage that the resilient surface immediately compensates for short-term pressure variations occurring within the moulding space, whereas the adjustment carried out on the basis of the information obtained from the pressure sensor has a more long-run effect.

BRIEF DESCRIPTION OF THE DRAWINGS

The invention will be described in more detail in the following with reference to the attached drawing, wherein.

DETAILED DESCRIPTION

Figure 1:
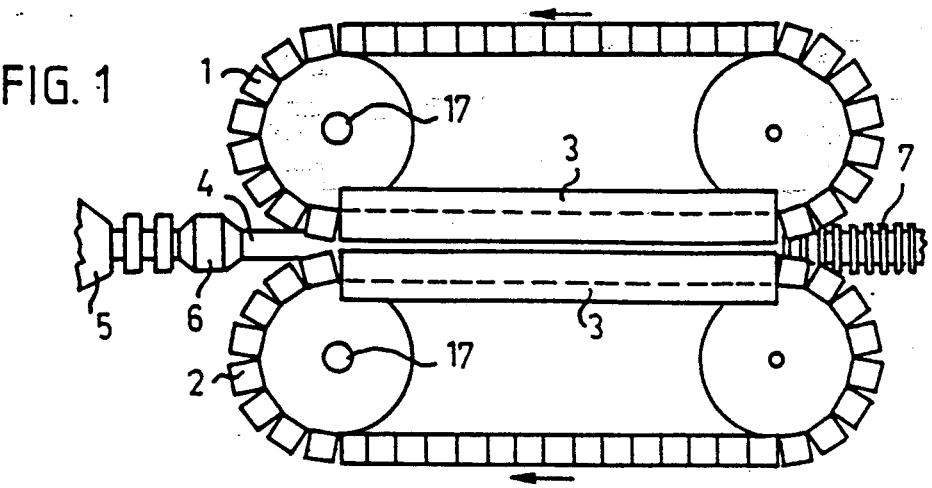
FIG. 1 is a general view of an apparatus for the production of ribbed pipes.

The apparatus shown in FIG. 1 comprises chill moulds 1 and 2 which move around along two endless paths and which meet each other within the area of guide rails 3 so as to form a cylindrical mould. An extrusion sleeve 4 connected to an extrusion head 6 of an extruder 5 extends into said mould. It is also shown in FIG. 1 how a finished pipe 7 protrudes from the other end of the mould formed by the chill moulds.

Figure 2:
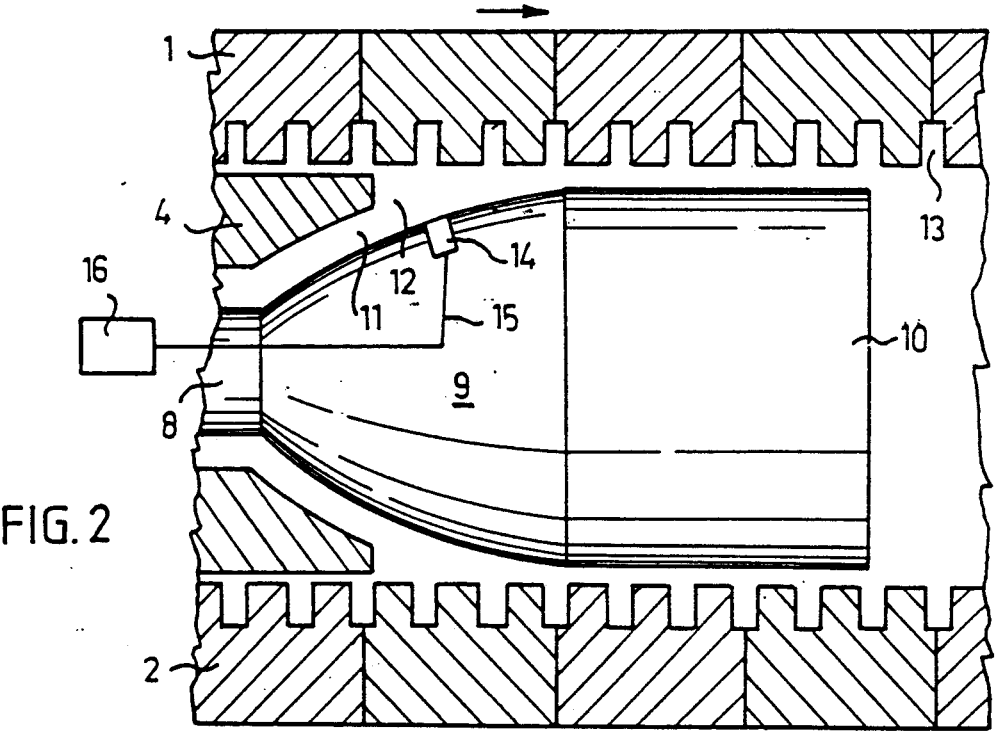
FIG. 2 is an enlarged longitudinal sectional view of a detail of the apparatus.

FIG. 2 is a more detailed view of those parts of the apparatus which take part in the moulding of the pipe. A spindle 8 is positioned on the central axis of the apparatus, the spindle comprising a part having a constant diameter and a substantially conically enlarging part 9.

Another constant-diameter part 10 is positioned after the enlarging part of the mandrel, which part 10 is provided with cooling means for stiffening the pipe.

The extrusion sleeve 4 and the mandrel part 9 define therebetween a ring nozzle 11 wherethrough the plasticized material, e.g. plastic material, is fed into a moulding space 12 defined between the end face of the extrusion sleeve 4, the chill moulds 1,2, and the mandrel part 9. In order to obtain a pipe having a ribbed outer face, the inner surface of the chill moulds is provided with mutually spaced grooves 13 into which the plastic material is forced for the formation of the ribs. The chill moulds 1,2 and the mandrel part protruding from the extrusion sleeve form the corrugating means of the apparatus.

According to the invention the pressure of the material contained in the moulding space 12 is measured by means of a pressure sensor 14 which is positioned on the surface of the mandrel part 9 in the embodiment of FIG. 2. The sensor communicates with a device 16 by means of a cable 15, which device adjusts the speed of the driving means (now shown) of the extruder 5 and/or the speed of the driving means 17 of the chill moulds 1, 2.

The apparatus shown in FIGS. 1 and 2 operates in the following way.

When the pressure of the moulding space 12 deviates from its set value, the pressure sensor 14 informs the device 16, which adjusts the speed of the extruder 5 or the chill moulds 1, 2. When the pressure of the moulding space is too high, the speed of the extruder is retarded or the chill moulds are accelerated, and when the pressure is too low, the extruder is accelerated or the chill moulds are retarded. Of course, these steps can be combined so that the extruder and the chill moulds are influenced simultaneously.

It has to be noted in this connection that the pressure of the moulding space 12 varies abruptly and periodically due to the shape of the inner face of the chill moulds. This is because the volume of the moulding space 12 varies considerably, depending on whether a groove 13 of a chill mould or a rib positioned between the grooves is positioned at the end face of the extrusion sleeve 4. It is obvious that the effects of this pressure variation have to be eliminated in the device 16 in order to prevent constant changes in the speed of the extruder and the chill moulds.

However, the above-mentioned periodical pressure variation can be utilized for the determination of the degree of fullness of the grooves 13. This is possible because the pressure changes are great when the grooves are filled up completely and small when the grooves are filled up incompletely. By measuring the extent of the pressure variation, information is obtained on the degree of fullness of the grooves, which is of crucial importance for the production of pipes.

Figure 3:
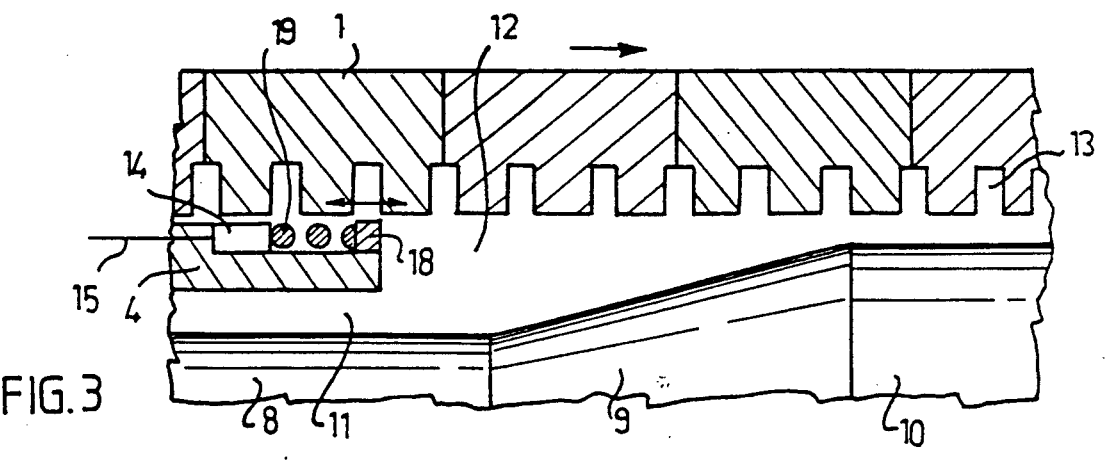
FIG. 3 is a partial view of another embodiment of the invention.

FIG. 3 shows another embodiment of the apparatus according to the invention. In this case the outer portion of the end face of the extrusion sleeve 4 is formed by a ring 18 moving in the direction of the axis of the mandrel. A spiral spring 19 surrounding the inner portion of the extrusion sleeve is positioned behind the ring 18, and the pressure sensor 14 is positioned behind the spiral spring. The pressure sensor bears on a shoulder of the extrusion sleeve.

In the embodiment described above, the ring 18 is displaced in the direction of the axis of the mandrel as a result of the abrupt and periodical pressure changes caused by the grooves 13, wherefore the pressure of the material contained in the moulding space remains substantially unchanged. If the average pressure of the moulding space deviates from the desired value, this cause a reduction or an increase in the press force exerted on the pressure sensor by the spring. According to the invention the speed of the extruder or the chill moulds is varied on the basis of this change.

If desired, the pressure sensor can be positioned both in the extrusion sleeve and in the mandrel, and it can be positioned at a distance from the surface of these means, provided that it is able to sense the pressure of the material contained in the moulding space. The spring 19 may be replaced by a member filled with a pressure medium.

What is claimed is:

1. A method for the production of ribbed pipes, in which method a pressurized plastic material is fed through an extruder (5) into a pipe moulding space (12) defined by a mandrel (8 to 10), an end face of an extrusion sleeve (4) and chill moulds (1,2) moving in the direction of the central axis of the mandrel and defining a mould cavity surrounding the extrusion sleeve and the mandrel, the inner face of the chill moulds being provided with annular grooves (13), characterized in that the pressure of the material contained in the moulding space (12) is measured, and that the feeding speed of the extruder (5) and/or the speed of travel of the chill moulds (1,2) is adjusted on the basis of the measured pressure.

2. A method according to claim 1, characterized in that the extent of the periodical changes in the pressure of the moulding space (12) due to the grooves (13) of the chill moulds and the ribs positioned between the grooves is measured for the determination of the degree of fullness of the grooves.

3. An apparatus for the production of ribbed pipes, comprising an extruder (5) formed by a mandrel (8,9) positioned on the central axis of the apparatus, and an extrusion sleeve (4) surrounding the mandrel, a ring-shaped nozzle (11) being defined by the mandrel and the extrusion sleeve for the feeding of a pressurized plastic material; and corrugating means formed by a mandrel part (9,10) positioned outside the extrusion sleeve and chill moulds (1,2) surrounding the extrusion sleeve and the mandrel and arranged to move in the direction of the central axis of the mandrel (8 to 10), the chill moulds, an end face of the extrusion sleeve and the mandrel defining therebetween a pipe moulding space (12), characterized in that a pressure sensor (14) is attached to the end face of the extrusion sleeve (4) defining the pipe moulding space (12), which pressure sensor communicates with a device (16) for adjusting the feeding speed of the extruder (5) and/or the speed of travel of the chill moulds (1,2).

4. An apparatus according to claim 3, wherein at least part (18) of the end face of the extrusion sleeve is resilient, characterized in that the resilient surface is formed by the end face of a spring-loaded or pressure-medium-loaded ring (18) and that the pressure sensor (14) is arranged to sense the spring force of the spring (19) or the pressure of the pressure medium.

5. An apparatus for the production of ribbed pipes, comprising an extruder (5) formed by a mandrel (8,9) positioned on the central axis of the apparatus, and an extrusion sleeve (4) surrounding the mandrel, a ring-shaped nozzle (11) being defined by the mandrel and the extrusion sleeve for the feeding of a pressurized plastic material; and corrugating means formed by a mandrel part (9,10) positioned outside the extrusion sleeve and chill molds (1,2) surrounding the extrusion sleeve and the mandrel and arranged to move in the direction of the central axis of the mandrel (8 to 10), the chill molds, an end face of the extrusion sleeve and the mandrel defining therebetween a pipe molding space (12) characterized in that a pressure sensor (14) is attached to the surface of the mandrel (8,9), which pressure sensor communicates with a device (16) for adjusting the feeding speed of the extruder (5) and/or speed of travel of the chill molds (1,2).

* * * * *